United States Patent [19]
Matthews

[11] Patent Number: 5,356,958
[45] Date of Patent: Oct. 18, 1994

[54] IMPACT RESISTANT THERMOPLASTIC SYNTACTIC FOAM COMPOSITE AND METHOD

[75] Inventor: Abraham M. Matthews, Wilmington, Del.

[73] Assignee: E. I. Du Pont de Nemours and Company, Wilmington, Del.

[21] Appl. No.: 107,644

[22] Filed: Aug. 20, 1993

[51] Int. Cl.$^5$ ................................................ C08J 9/32
[52] U.S. Cl. ..................................... 523/219; 521/54; 521/55; 523/218
[58] Field of Search ..................... 521/54, 55, 189; 523/218, 219

[56] References Cited

U.S. PATENT DOCUMENTS

| | | | |
|---|---|---|---|
| 4,013,810 | 3/1977 | Long | 428/308 |
| 4,598,007 | 7/1986 | Kourtides et al. | 428/116 |
| 4,788,230 | 11/1988 | Mudge | 523/219 |
| 4,837,251 | 6/1989 | Okey et al. | 523/218 |
| 4,933,131 | 6/1990 | Okey et al. | 264/255 |
| 5,120,769 | 6/1992 | Dyksterhouse et al. | 521/54 |

*Primary Examiner*—Morton Foelak

[57] ABSTRACT

Typical embodiments of the syntactic foam panel construction which characterize the intention have (1), at least one face sheet of thermoplastic resin reinforced with microballoons and (2) a foam core prepared from thermoplastic syntactic foam flakes consisting of a mixture of hollow glass microballoons, short reinforcing fibers and thermoplastic resin.

2 Claims, 1 Drawing Sheet

IMPACT RESISTANT THERMOPLASTIC SYNTACTIC FOAM COMPOSITE AND METHOD

BACKGROUND OF THE INVENTION

This invention relates to an impact-resistant laminate structure, more particularly, it relates to a low density laminate having a toughened reinforced resin facing adhered to a syntactic foam core and the method for making the core and laminate.

For purposes herein, syntactic foams shall be defined as materials comprised of rigid, hollow microballoons adhered together with a bonding agent. Syntactic foams differ from blown foams, such as polystyrene foam or polyurethane foam, in that the cells in syntactic foams are formed by incorporation of small diameter, rigid microspheres into a bonding agent (typically, a resin binder) rather than by expansion with a blowing agent. It is also known in the art that short reinforcement fibers can be incorporated into the bonding agents, along with microspheres, in order to enhance structural and/or other desired properties.

The bonding agents generally used in the art are either thermosetting resins, or thermoplastic resin matrices. Some examples of the thermosetting resins used as bonding agents may be epoxy resins, bismaleimides, cyanates, unsaturated polyesters, non-cellular polyurethanes, thermosetting polyimides, and the like. Pertinent examples of the thermoplastic resin matrices used include polyaryletherketones, polyphenylenesulfide, polyimides, polyetherimides, and aromatic and aliphatic nylons, just to name a few. The microballoons (or microspheres) are generally rigid and hollow spheres of glass, carbon, polystyrene, or phenolic resins. The most commonly used or most commonly known hollow spheres in the syntactic foam art are glass microspheres (e.g., Scotchlite TM Glass Bubbles from 3M Company) offered commercially in particle densities ranging from ~0.1 to 0.6 g/cc and diameters on the order of 5 to 200 microns.

Syntactic foams are prepared, basically, by mixing or dispersing microspheres with the thermosetting or thermoplastic bonding resin, and subsequent thermoforming ("curing" for thermosets, "press-molding" for thermoplastics) into a desired shape. However, since the microballoons are extremely small in size, and extremely lightweight in comparison to the densities of resins, the mixing stage is known to be fraught with difficulties which result in both process and product limitations. The various preparation methods disclosed in prior art and the specific process and product related limitations and problems are discussed below.

Preparation methods known in the art, in brief, are the following: 1) Dry blending of powder of the bonding agent (a thermoplastic resin or a thermoset, if the latter is solid) and the microspheres, followed by thermal press-bonding/shaping and/or curing. An alternative approach to this method, when using thermoplastics, is to add microspheres to a melt of the thermoplastic in an extruder or a kneader. 2) Mixing (or spray coating) of the microballoons in a liquid, where the liquid is either a low viscosity thermosetting resin or a solution of a thermoplastic matrix in an aprotic solvent, with a subsequent dry-off or evaporation of the solvent from the resulting pasty mass during the curing or molding process. 3) Preparation of thermoplastic syntactic foams by forming a slurry or a paste of the thermoplastic powder and microspheres in a volatile liquid which is a nonsolvent for the thermoplastic, as disclosed in U.S. Pat. No. 5,120,769.

There are process/product limitations and problems faced by the methods described above. More particularly, in the dry (solids) blending method, since the microspheres are extremely lightweight and very fine in size, a number of serious problems are encountered, namely: a) the microspheres take on the characteristic of a fine airborne dust, thus posing environmental problem; b) the dry mechanical/frictional mixing and rough handling causes significant breakage of the relatively fragile hollow glass microspheres; c) the higher density thermoplastic particles are prone to settling to the bottom of the container, thus causing non-uniformity in composition; and, d) it is practically impossible to make lower density (e.g., <35 lbs/cu.ft.) syntactic foams which, in essence, are the most desired for weight/fuel cost savings in aerospace structural applications. This is due to the inability to mix-in higher amounts, e.g., any amounts higher than approximately 15–20% weight content of microspheres in the resin matrix, because of the very high bulk volume-to-weight ratio of the microballoons compared to the resin.

Prior art methods of mixing the microballoons (and other relevant additives, e.g., fibers, etc.) in a solution of the resin, as disclosed in U.S. Pat. No. 4,077,922, have the following drawbacks: Potential environmental safety and health hazards are posed by volatile solvents, used as a general rule for ease of evaporating them off during thermoforming. Defects and structural non-uniformities are created when the solvent is being driven off by heat from the interior of the syntactic foam, since the fast evaporating solvent tends to draw-off the resin from the surface of the microspheres at varying rates depending upon spatial location. This effect also makes it difficult to obtain batch-to-batch reproducibility. Another drawback of this method is the additional energy or cost associated with transporting the solvent-laden pasty mass to the molding or curing equipment. Solvent release and evaporation during this procedure is also possible which would pose environmental and health concerns for a commercial operation.

Syntactic foams preparation process route by way of forming a slurry or a paste of thermoplastic powder and microballoons in a volatile liquid which is a non-solvent for the thermoplastic, although minimizes some of the problems encountered in both the dry blending method and the solvent based mixing approach, it still maintains some of the same key drawbacks: (a) high cost of transportation, and/or health risk from prolonged-exposure to heavy solvent-laden pasty mass or slurry, (b) extra costs and environmental risks associated with use of large quantities of process additives needed such as thickeners, binders, surfactants and the like, and, (c) the limitation to the use of thermoplastic resins only in a form of fine ground powder form are some of the most obvious drawbacks.

SUMMARY OF THE INVENTION

The foregoing problems can be overcome and the needs expressed satisfied through the practice of this invention which includes a method for preparing a syntactic foam core by mixing a thermoplastic resin in the form of pellets, powder or crumb with acid to form a mixture, heating ( up to about 100° C.) and stirring the mixture to form a homogeneous and stable viscous resin solution, adding by stirring into the solution glass microspheres with or without an amount of short synthetic fibers to form a composition. The composition is then gently agitated in a container with water to form coagulated flakes. The flakes are then neutralized and dried before compression molding the flakes into a formed object.

Suitable fibers are carbon, aramid and glass. The thermoplastic resin is selected from any series of high performance thermoplastics which exhibit complete solubility in dichloroacetic acid without any degradation effect under the mild dissolution conditions as set forth in this invention. Such thermoplastics include, but not limited to, polyaryletherketones, e.g., PEKK, PEEK, etc.; polyetherimides, e.g., Ultem ® 1000, and the like; and polyphenylenesulfides.

The invention also includes a panel comprising a syntactic foam core of resin mixed with glass microballoons with or without short synthetic fibers having at least one face sheet adhered to the core. The face sheet is formed of a resin compatible with the core that is filled with 7-10 percent by weight of glass microballoons smaller in size and greater density than the microballoons in the core.

BRIEF DESCRIPTION OF THE DRAWINGS

A full section view of a side elevation of a syntactic foam panel that embodies this invention.

DETAILED DESCRIPTION OF THE INVENTION

Figure 1:
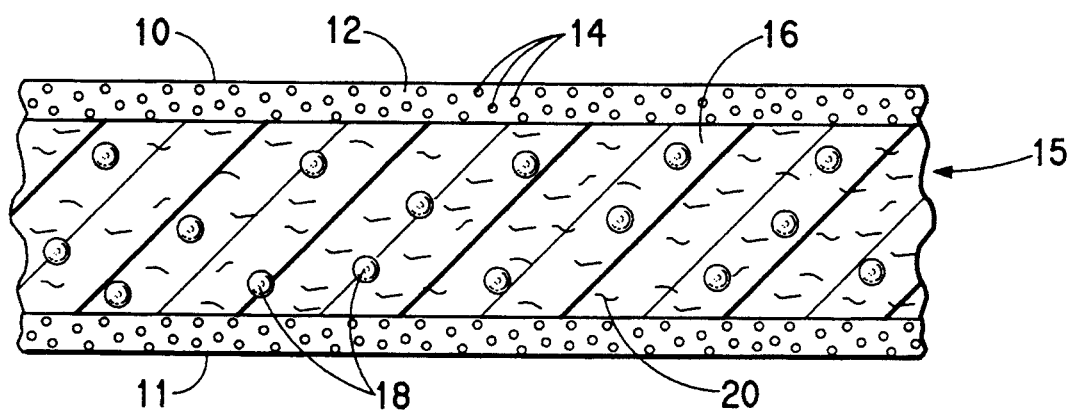

The embodiment chosen for purposes of illustration of the product of this invention includes a pair of parallel spaced face sheets 10, 11 of thermoplastic resin 12 reinforced with glass microspheres 14. Core 15 is a mixture of thermoplastic resin 16, glass microspheres 18 and short synthetic fibers 20.

The process of manufacture consists of two key stages:
1) Preparation of syntactic foam of this invention. This involves dispersion coating/blending of the hollow glass microballoons and the short reinforcement fibers in a solution of the thermoplastic resin in a dichloroacetic acid solvent. The solvent is then stripped or washed off using water. This causes the thermoplastic resin, which carries the hollow microspheres and the reinforcement fibers, to coagulate out of the solution in the form of loose, unconsolidated and fluffy flakes, where the microballoons and the re-inforcement fibers are uniformly dispersed in the resin matrix and intimately bound to it. Subsequent drying of these unconsolidated, fluffy flakes in a vacuum oven ($\sim$20-22 in. $H_2O$) at a temperature approximately 20-30 deg. C. below the glass transition temperature of the thermoplastic resin yields dry, unconsolidated, dust-free and free-flowing syntactic foam flakes (or chips). This material is characterized by low bulk density (0.05-0.5 g/cc) and with approximate dimensions of 5-20 mm in length, 1.5-5 mm in width and $\sim$1.2-3.5 mm in thickness, having an irregularly shaped periphery.
2) The second stage which consists of low-pressure thermoforming (e.g., thermal compression molding) of the flakes obtained above into a shaped solid syntactic foam-core composite part, which is characterized by light weight, and uniquely-high strength and high stiffness-to-weight ratio, both in compression and in shear.

The preferred embodiments of the syntactic foam core structure of this invention are as follows: Syntactic foam core structures with densities from approximately 10 pounds per cubic foot (pcf) to 40 pcf, but preferably from 15 pcf to 30 pcf, and most preferably from 18 pcf to 25 pcf. The thermoplastic resin content ranges from approximately 20% to 85% by weight, and preferably from 40 to 75%, and most preferably from 50 to 70% by weight of the foam composite. Reinforcement fiber content ranged from 0 to 5% by weight, but preferably from 1-4%, and most preferably from approximately 2-3% by weight. Hollow glass microspheres constituted the balance of the compositional weight. Preferred microballoons are those with nominal average particle densities within the range of approximately 0.125 gm/cc to 0.22 gm/cc, or with bulk densities within the range of approximately 0.05 gm/cc ($\sim$3 pcf) to approximately 0.17 g/cc ($\sim$11 pcf). Examples of suitable microballoons are SCOTCHLITE ™ glass bubbles: Type K Series (K1, and K2); type C15/250, and E22/400,—all of which are commercially available from 3M Company.

EXAMPLE

The unconsolidated, dry syntactic foam flakes consisting of an intimate blend of the thermoplastic resin matrix, reinforcement short fibers, and glass microballoons are prepared as follows: A) Preparation of the thermoplastic Solution: A solution of the thermoplastic resin namely, poly (ether keto-ketone) "PEKK", in dichloroacetic acid solvent is first prepared in the following manner. 300 gms sample of commercial grade PEKK resin (Declar(R) grade, 40 MI) pellets were loaded into a 3-liter three-neck round,bottom pyrex flask equipped with an electric heating mantle, a motor-driven blade stirrer, a thermometer probe for measuring temperature of flask contents and a feed port. Then, 3000 gms of dichloroacetic acid solvent (i.e., 1:10 wt. ratio of resin to solvent) was carefully added into the flask through the feed port. The feed port and the thermometer probe necks were then sealed, and gradual stirring was initiated. The temperature of the flask contents was thereafter raised to approximately 85 deg. C. while gradually increasing the stirring speed at the same time in order to effect high rate of solvent/resin mass transfer or dissolution. After approximately 2 hours of good stirring at approximately 85 deg. C., the PEKK resin was totally dissolved in the dichloroacetic acid solvent—and a homogeneous and stable viscous solution ($\sim$9.1% solids content) of the thermoplastic was obtained. Stirring and heating were then stopped, and the resin solution was cooled down to room temperature, recovered ($\sim$3150 gms), sealed, and stored for further use. B) Resin/Fiber/Microballoon Blending: In order to prepare a Resin/Fiber/Microballoon Syntactic blend composition of 65/3/32 wt. %, respectively, 100 gms of Type K2 Scotchlite ™ glass bubbles (or microballoons) nominal particle density of approximately 0.19 g/cc obtained from 3M company, were loaded into a 4-liter volume, 29.21 cm. I.D., cylindrical glass kettle fitted with a three-port lid, and equipped with a motor-driven perforated Teflon ® coated baffle-type blade stirrer (26.67 cm diameter by 8.9 cm vertical height and 3.175 mm thick blade, with $\sim$1.3 cm. diameter hole perforations in order to optimize mixing/mass transfer). Then, 9.3 gms of Kevlar ® 49 short fibers ($\frac{1}{4}$"-long) were carefully loaded into the kettle. Next, 2233 gms of the thermoplastic solution, prepared in step (A) above, was gradually added into the glass kettle while the perforated baffle stirrer was rotated very gently at slow speed (~5-10 rpm). After addition of the solution was completed, an additional 560 gms (~25% of the amount of the solution added) of the dichloroacetic acid solvent was added in order to reduce the viscosity of the mass in the kettle. The feed port were then sealed, and blending of the kettle mass was conducted for approximately 1 hour by gradually increasing the stirrer speed to 20-25 rpm. A homogeneously blended, pasty and sponge-like mass of resin/fiber/microsphere system in dichloroacetic solvent medium, was obtained at the end of the one hour blending. C) Solvent Removal/Stripping: The homogeneous, pasty and sponge-like blend, obtained in step (B) above was then transferred to a 5-gallon plastic bucket provided with a motor-driven agitator which was equipped with two propeller-type blades. Water was next introduced into the bucket up to half-full level, while medium speed agitation was initiated simultaneously. Additional water was then introduced into the bucket to approximately full level and medium speed gentle agitation was continued for approximately 30 minutes. The PEKK resin, with the Kevlar® reinforcement fibers and the glass microspheres bound to it, had coagulated out of the solution in a form of loose, unconsolidated fluffy flakes as the result of the dichloroacetic acid solvent being stripped-off by water due to their high mutual affinity/miscibility. The water/dichloroacetic acid liquid phase was carefully drained off from the bucket, and the unconsolidated fluffy material was then transferred to a 5-gallon 60-mesh wire screen cylindrical basket with ss-steel solid bottom base, and rinsed to a neutral pH using a continuous fine spray of water supplied by a spray nozzle mounted over the basket. All of the wash/drain water containing the solvent was collected in a recovery drum for solvent recycling, via distillation (B.P. dichloroacetic acid ~196° C.). Thus the entire process is conceptually a closed-loop system, and environmentally friendly. D) Drying of the flakes: The moist, unconsolidated Resin-Fiber-Microsphere blend flakes obtained from step (C) above were transferred to a perforated (~20 mesh) ss-steel tray, with an aluminum foil lining on the bottom, and dried overnight in a vacuum oven at approximately 20-22 in. of water, and at ~125 deg. C. The following day, approximately 295.3 gms. (which represented ~94.5% yield) of dry, unconsolidated intimate blend material of white color was obtained, which was characterized by flakes of very low bulk density (~0.08 g/cc) and with dimensions of ~5-20 mm in length, 1.5-5 mm in width, and 1.2-3.5 in thickness. This material was stored either in plastic bags or large plastic jugs until further use.

IMPACT-RESISTANT SYNTACTIC FOAM COMPOSITE:

An impact-resistant syntactic foam core composite of this invention is prepared as follows. First, a design choice is made regarding the density and the geometrical dimensions of the syntactic composite required— e.g., possible density choices from ~12-40 pounds per cu. ft., and any needed syntactic foam size (i.e., length, width, and thickness). In this example, preparation of an approximate 18 pcf, 12"×18" by ½" thick foam composite was conducted. Approximately 511 gms of the syntactic foam flakes of this invention (obtained from step (D) above) were loaded into a 2" deep, 12"-wide by 18"-long stainless steel frame mold, equipped with a thermocouple probe, and in which the bottom plate was covered with a 5-mil aluminum-foil layer treated with frekotte-44NC mold release. The flake were spread and leveled evenly inside the mold cavity, and then covered on top with another layer of frekotte -44NC treated 5-mil aluminum foil. Next, the top plate of the mold was mounted in place, and the sample was ready for thermal press molding. Thermal press molding to required thickness of ½" was conducted in two stages, which consisted of: preparation of a 2"-thick lightly-consolidated preform, and compression molding of the preform to the required thickness of ½".

The mold prepared above was placed in a 40-ton capacity platen press which was preheated to 500 deg. F. (~260 deg. C.). The press/platens were then closed and brought to full contact with the mold, and the mold temperature was brought up to approximately 620 deg. F. The mold was held at 620 deg. F. for approximately 10 min, after which, heating was turned off and an automatic cool cycle was applied. After the mold was cooled down to ambient temperature, a lightly consolidated, approximately 2" thick, 12"×18" preform was removed from the mold by disassembling the 2"-deep shims which form the frame of the mold.

The 2"-thick lightly consolidated preform, as prepared above, was then placed in a ½"-deep, 12"×18" frame mold, after the bottom plate was first covered with frekotte-44NC-treated 5-mil aluminum foil on top of which were placed 2 layers of 4-mil thick impact-toughened PEKK film. The PEKK film was filled with ~7-10% by wt. microspheres with an average particle density of approximately 0.4 gm/cc. Another 2 layers of the 4-mil thick impact-toughened PEKK film were carefully placed on top of the preform, and then a frekotte-treated aluminum foil top cover was placed on top. The frame mold was next closed and sealed with the top plate, and placed in the platen press discussed above which was preheated to 500 deg. F. The press was then closed to "kiss" pressure (i.e., full grip contact with the mold, but no measurable pressure), and the press temperature was set at approximately 630 deg. F. When the temperature of the mold, as measured by the mold thermocouple, reached about 625 deg. F., approximately 20-25 psi pressure was applied to the mold and the preform sample was/pressed down to a half inch thickness, after which it was held for approximately 10 minutes under the aforementioned temperature and pressure. Next, the heating was shut down, and the Auto-Cool Cycle was turned on. After the mold temperature cooled down to ambient temperature, the pressure was fully released and the press was opened. The four side shims or walls of the frame mold were carefully disassembled, and the syntactic foam composite panel was recovered by removing both the top and bottom aluminum foil release covers.

The fiber-reinforced, PEKK thermoplastic-based syntactic foam composite panel, 12"×18"×½", obtained as described above had a density of approximately 18.5 lbs/cu. ft. Dynamic Izod Impact Energy tests were conducted to measure impact resistance characteristics according to ASTM standard No. D-256. The data is shown below.

| Density (PCF) | Thickness (in.) | Izod Impact Energy (j/m) | |
| --- | --- | --- | --- |
| | | Notched | Unnotched |
| 18.5 | 0.5 | 22.73 | 80.80 |

What is claimed is:

1. A process for preparing dry syntactic foam flakes comprising the steps of: mixing thermoplastic resin with dichloroacetic acid in a 1:10 to 1:20 wt. ratio of resin to acid to form a mixture; heating said mixture up to about 100° C. while stirring a sufficient amount of time to form a homogeneous and stable viscous resin solution; adding to said solution a sufficient amount of glass microspheres and short fibers to form a composition of resin, glass microspheres and fibers respectively; stirring said composition; agitating said composition in a container with water to form coagulated flakes of resin, glass microballoons and fibers; draining said water and dichloroacetic acid from said container; and neutralizing then drying said flakes.

2. The process of claim 1, including the stage of compression molding said flakes into a formed object.

* * * * *